United States Patent [19]

Arnold

[11] 4,193,665
[45] Mar. 18, 1980

[54] FIBER OPTIC CONTACT ALIGNMENT DEVICE

[75] Inventor: Bruce K. Arnold, El Toro, Calif.

[73] Assignee: International Telephone and Telegraph Corporation, New York, N.Y.

[21] Appl. No.: 662,732

[22] Filed: Mar. 1, 1976

[51] Int. Cl.² .............................................. G02B 5/16
[52] U.S. Cl. ................................. 350/96.22; 350/96.21
[58] Field of Search ................ 350/96 C, 96 B, 96.20, 350/96.21, 96.22; 174/84 S, 84 C, 84 R

[56] References Cited

U.S. PATENT DOCUMENTS

| 1,975,885 | 10/1934 | Wellman | 174/84 S |
| 2,109,517 | 3/1938 | Xenis | 174/84 S |
| 3,936,142 | 2/1976 | Kersten | 350/96 C |
| 3,936,145 | 2/1976 | McCartney | 350/96 C |
| 3,946,467 | 3/1976 | Lukas et al. | 350/96 C X |
| 3,972,585 | 8/1976 | Dalgleish et al. | 350/96 C |

*Primary Examiner*—Stewart J. Levy
*Attorney, Agent, or Firm*—Thomas L. Peterson

[57] ABSTRACT

An alignment sleeve for insuring the lateral alignment of a pair of abutting fiber optic cable ends which are inserted into a connector in a light transmissive relationship. The alignment device is in the form of an elongated, generally tubular, relatively thin-walled, hollow sleeve having a mid-section which includes three inwardly projecting portions regularly spaced about the sleeve. The inserted fiber optic cables abut in the mid-region of the sleeve and are laterally aligned by the inwardly directed forces thereby applied.

3 Claims, 7 Drawing Figures

FIBER OPTIC CONTACT ALIGNMENT DEVICE

BACKGROUND OF THE INVENTION

1. Field of the Invention

The present invention relates to connectors for fiber optic cables.

2. Description of the Prior Art

In the prior art, various arrangements have been devised for a connectable and disconnectable fiber optic cable connector. One prior art example of such a connector is described in U.S. Pat. No. 3,914,015.

One of the more significant problems in designing and building fiber optic cable connectors is that of maintaining adequate lateral alignment in two orthogonal coordinates in the plane of abutment at the light-transmissive interface between fiber optic cables so connected.

In preparing fiber optic cable ends for installation into a connector body, it is common practice to terminate the end of the cable in a ferrule or termination pin, which provides a manageable fiber-end retainer. After a cable has been secured in such a device, the ends of the optical fibers may be optically polished to enhance the quality of the light-transmissive interface.

Concerning the problem of lateral alignment as aforementioned, there have been various approaches to that problem. One such approach is described in U.S. Pat. No. 3,734,494. In that patent, a sleeve of elastomer material is axially compressed and expands radially inward to hold the lateral alignment of the cable ends to be connected. An improvement on this general concept is described in U.S. Patent Application Ser. No. 613,053, filed Sept. 15, 1975 (assigned to the Assignee of the present application). Still further, another connector arrangement for fiber optic cables which addresses the lateral alignment problem is described in U.S. Patent Application Ser. No. 629,004 filed Nov. 5, 1975 abandoned in favor of continuation-in-part application Ser. No. 682,274 filed May 3, 1976 (both assigned to the Assignee of the present application).

In general, the elastomer alignment sleeve is less likely to provide an accurate and repeatable lateral alignement than provided by a solid metallic alignment device. Still further, it is important that the fiber optic connectors not only perform well and repeatably, but also that they be economically manufactured. Many of the fiber optic connectors of the prior art have been deficient in respect to one or both of these criteria.

The manner in which the present invention improves on the state of the fiber optic connector art will be understood as this description proceeds.

SUMMARY OF THE INVENTION

In accordance with the state of the prior art as aforementioned, it may be said to have been the general objective of the present invention to produce an inexpensive, accurate and repeatable lateral alignment device for incorporation in single or multiple-connection fiber optic connectors.

The device of the present invention assumes that the fiber optic cable ends to be connected into a light-transmissive relationship are each appropriately terminated by use of a ferrule or termination pin, as aforementioned, and that the alignement of these ferrules or termination pins is tantamount to correct lateral alignment of the optical fibers (cable ends) themselves.

The device of the invention includes a generally tubular, elongated and relatively thin-walled member having two end portions each sized to receive one of a pair of cable ends to be connected, and a mid-region within said member which includes at least three inwardly directly portions of the tubular wall. In one embodiment, these may be "dimples" spaced, for example, 120° circumferentially. In another embodiment, the central or mid-region of the tubular device is formed into a generally triangular cross-section in which the sides may be straight or somewhat inwardly depressed or bowed. In either case, resilient inwardly directed forces operative from at least three (preferably 120° spaced) bearing points tend to align the ferrules which terminate the cable ends, and therefore to align the light transmissive interface.

The details of the manner in which the embodiments are constructed and operate, as well as variations thereof, are described hereinafter.

DESCRIPTION OF THE PREFERRED EMBODIMENTS

Figure 1:
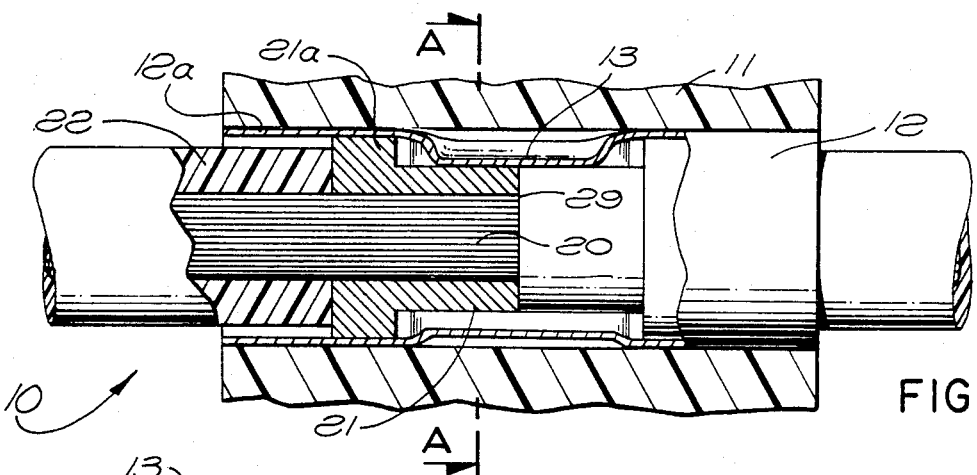
FIG. 1 is a partially sectioned assembly of the tubular member of the present invention with appropriately ferruled optical fiber ends inserted therein, as inserted into a bore or socket of a connector body.

Referring now to FIG. 1, one form of the alignment sleeve of the present invention is shown at 10, as it might typically be inserted into a socket or bore in a connector body 11. Two sleeve end portions of the device are represented at 12 and 12a and between these, a central mid-region section 13 is shown including three inwardly directed generally oval dimples. The cable is illustrated as containing plural optical fibers 20, however, it is to be understood that a single optical fiber may also be accommodated by the present invention.

Figures 2, 3:
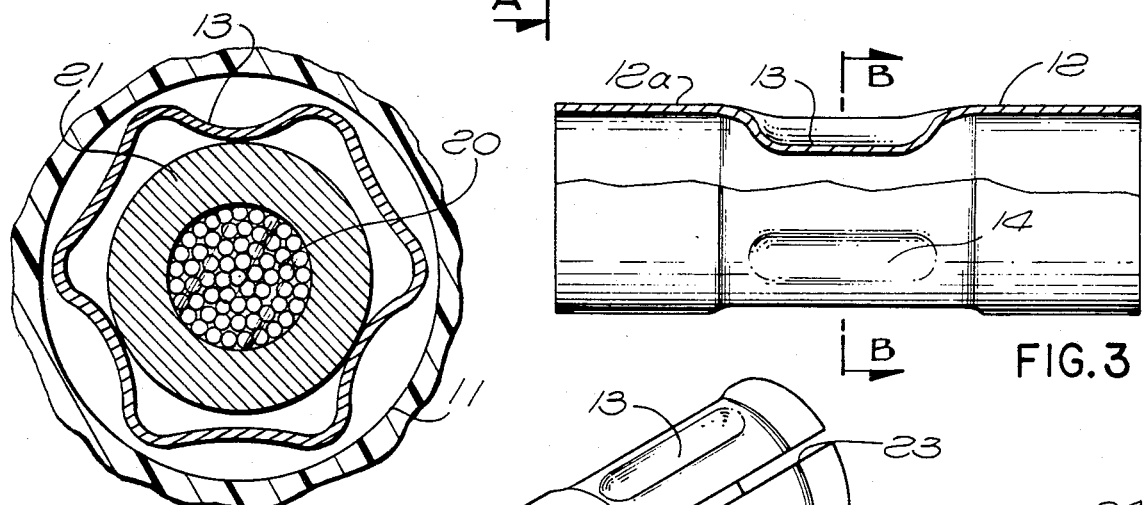
FIG. 2 is a cross-sectional view taken through FIG. 1, as indicated.
FIG. 3 is a view of the dimpled embodiment of the alignement sleeve according to the invention.

It will be realized that the designation 13 actually represents one of the three dimples and this may be more clearly understood from FIG. 2.

In the fiber optic connector art, the optical fibers and cables are generally of very small size and accordingly, it will be realized that the views of FIGS. 1 and 2, and for that matter, all of the figures presented herewith, are enlarged and exaggeration or enlargement applies not only the alignment sleeve itself, but also to the ferrule or termination pin 21 and all related parts.

Referring now to FIG. 3, the alignment sleeve itself with the central or mid-region dimples is illustrated in FIG. 3. The end portions 12 and 12a and two dimples 13 and 14, will be seen. The actual lengths of these end portions 12 and 12a and the mid-region containing 13 and comparison dimples is an engineering design matter subject to variation. It is important, however, that the dimples be long enough in the longitudinal dimension to "surround" the optical interface 29.

Figure 4:
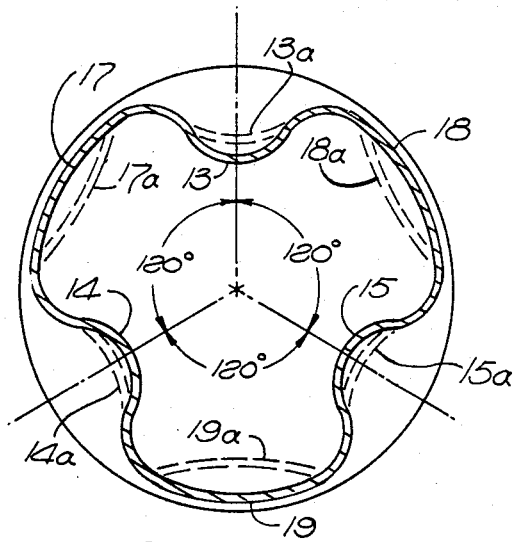
FIG. 4 is a sectional view as indicated through FIG. 3.

The sectional view of FIG. 4 illustrates the quiescent shape of the alignement sleeve (tubular member), that is, with no cable inserted therein; and also illustrated is the deflected shape of the member, that is, with cables inserted. In FIG. 4, the inwardly directed dimples which actually contact the cable ferrule are shown at 120° circumferential spacings at 13, 14 and 15. The maximum radius portions of the member are obviously also three in number, typically 17, 18 and 19.

With the ferruled cable in place, 13 extends itself outwardly radially, to a position such as 13a, and 14 similarly extends to 14a, while 15 extends to 15a. These identifications followed by the letter "a" therefore represent the "active" shape of the device, namely, with a ferruled cable inserted therein. It will be noted that the portions 17a, 18a and 19a deflect inwardly to a compensatory deflection position resulting from insertion of the ferrule cable, as aforementioned. At these positions 17a, 18a and 19a, the inwardly deflected portions of the perimeter of the alignment sleeve do not necessarily come in contact with the optical fiber ferrule, at least not in a substantial force-producing relationship. Moreover, the maximum radius of the sleeve in the socalled mid-region is preferably slightly less than the bore or socket in the connector body member 11 so that there is no appreciable interrelation between the bore and the mid-region of the alignment sleeve. The end portions 12 and 12a however, preferably fit snugly into the said socket in the body 11.

Returning now to FIG. 1, the typical installation involves the cable jacket 22, which is removed in the portion of the cable inward from the beginning of the ferrule or termination pin 21 exposing the fibers 20. The ferrule 21 is illustrated with a radially enlarged portion 21a, however, it is to be understood that this is not a necessary part of the structure for effective implementation of the invention.

Figures 5, 6:
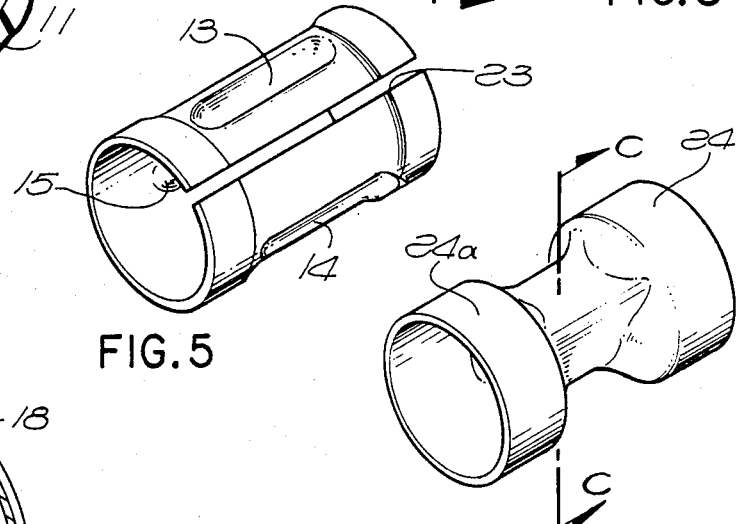
FIG. 5 is a longitudinally slotted variation of the device of FIG. 3.
FIG. 6 is a second embodiment of the device of the invention.

Referring now to FIG. 5, the sleeve of FIG. 3 is illustrated with a longitudinal slot 23. This slot is best located circumferentially spaced between two of the dimples, such as 13 and 14, but is not necessarily parallel to the axial centerline of the alignment sleeve. Preferably, it should not depart greatly from being parallel to the said centerline however.

Although the alignment sleeve embodiments of FIGS. 3, 5 and 6 are preferably made of a relatively strong spring metal material, there is no requirement for conductivity, consequently there is a relatively broad choice of engineering materials available, such that a selection can be made on the basis of cost, ease of manufacture, and adaptability to environmental factors such as corrosion, etc. In the embodiment of FIG. 3, we have considered only the resilient characteristics of the midregion of the alignment sleeve, however, quite obviously the entire sleeve would be manufactured of the same material. Certain grades of stainless steel, beryllium copper, and other spring-characteristic metals can provide the desired resilience for the device of the invention according to any of the embodiments or variations comtemplated.

In FIG. 5, the slot 23 can provide two ancillary advantages. The first of these is ease of manufacture with machinery and tooling commonly applied in the analogous electrical connector arts. Secondly, the resilience of the material can provide a radially outward force when installed in a socket or passage of a connector body, as illustrated in FIG. 1. That is, the insertion of the alignment sleeve of FIG. 5 would involve at least partial compression, at least partially closing the slot 23, the radially outward force thereby generated due to the spring characteristics of the material of the alignment sleeve can act to hold the sleeve in place within the connector socket or passage aforementioned. When thus installed in the connector body socket, the slot 23 is at least partially closed or may be substantially closed.

Figure 7:
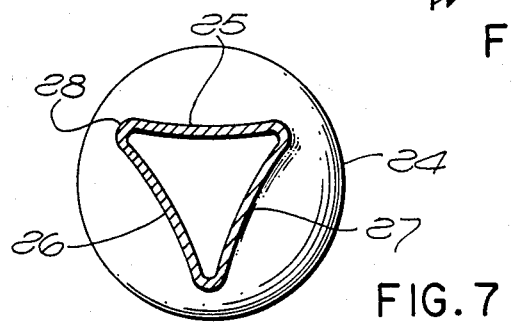
FIG. 7 is a section taken through FIG. 6 as indicated.

Referring now to FIG. 6, an alternative embodiment of the device according to the present invention, is illustrated. In lieu of the dimpled mid-section of the FIGS. 3 and 5 devices, the resilient mid-region of the alignment sleeve may take the form of a triangular or modified triangular cross-section. In FIG. 6, the end portions 24 and 24a are comparable to 12 and 12a of FIG. 3. One actual shape of this modified triangular midregion is illustrated in the section view of FIG. 7. Here the three sides of the "triangle" 25, 26 and 27, will be seen to be formed with a slight inward bow. This particular nuance of shape is not actually a requirement, since it will be readily realized that the mid-points of the three sides of a true triangular shape would provide the three bearing points on the fiber optic cable ferrule comparable to the dimples in FIGS. 3 and 4. In deflecting outward, these triangle sides 25, 26 and 27, will produce a certain amount of compensating deflection at the corners of which 28 is typical. Since the portions of the alignment sleeve 24 and 24a serve to hold and place the alignement sleeve within the connector body socket, it is not necessary that the points (of which 28 is typical) should contact the inside of the socket, although there is no prohibition against this, provided the compensatory deflection of these corner points (such as 28) is not inhibited by contact with the socket.

In FIG. 6, the triangle shape goes through a shape transition on either side of the mid-region as it flares out into end sections 24 and 24a. This provides a guidance function for the inserted ferruled fiber optic cable as it is inserted, in the same way as the edges of the dimples in the FIG. 3 and 5 versions provide that function.

Referring once again to FIG. 1, it will be realized that only a portion of the connector body 11 is illustrated, and of course, it will be realized that such a connector body could include a number of sockets accommodating a corresponding plurality of the alignment sleeves according to the invention and accordingly, could provide for the connection and the disconnection of a corresponding plurality of fiber optic cable circuits.

It will be realized from the foregoing, that forces due to connector tolerances and cable loads can be varied, as required by selection of material thickness for the alignment sleeve, by the depths of the dimples in the FIGS. 3 and 5 versions, as well as by the length of the mid-region triangular cross-section in FIG. 6. As indicated before, the shoulder portion 21a on the ferrule or termination pin 21 is not necessarily a part of the present invention, and to facilitate connector engagements, some initial lateral play before the actual light transmissive abutment occurs within the aforementioned midregion of the alignement sleeve eliminates the need for very close tolerances in the socket hole patterns in multi-channel connector bodies; this again being true because of the automatic alignment occurring during engagement.

Once the principles of the present invention are understood by those skilled in this art, various modifications will be seen to be possible within the spirit of the invention, as claimed. Accordingly, it is not intended that the scope of the invention should be considered limited by the drawings or this description, these being typical and illustrative only.

What is claimed is:

1. In a fiber optic cable connector, a device for effecting lateral alignment of a pair of abutting generally cylindrical fiber optic cable termination pins in light transmission relationship, comprising:

an elongated, generally tubular, relatively thin-walled, member having a mid-region and two end portions, said mid-region having not more than one longitudinally extending narrow slot therein whereby said mid-region has a substantially continuous perimeter, said end portions being each sized to receive a corresponding one of said pins, said pins being inserted therein and abutting within said mid-region;

termination pin alignment means comprising a plurality of resilient, radially, inwardly formed wall portions within said mid-region of said member defining a restricted bore therein, said wall portions being uniformly circumferentially spaced from each other, the transverse cross-section of said pins in said mid-region being greater than the cross-section of said restricted bore whereby said wall portions deflect radially outwardly when said pins are inserted in said restricted bore, the remaining perimeter of said member at said mid-region thereof being arranged and shaped to assume a position of compensatory deflection upon outward deflection of said wall portions, said inwardly formed wall portions thereby exerting resilient, radially inward forces against said pins, at least at the location of said abutting, causing said pins to be precisely laterally aligned; and said inwardly formed wall portions being inwardly curved sides of said mid-region of said member, said mid-region being of generally triangular cross-section, the centers of the three sides thereof exerting inwardly directed alignment forces against said pins at least adjacent to said abutting location.

2. Apparatus according to claim 1 in which the maximum radial dimension of said mid-region of said member is less than the radius of said two end portions of said member, said end portions of said member being of substantially circular-cross-section of a radial dimension suitable for insertion within a connector body socket.

3. In a fiber optic cable connector, a device for effecting lateral alignment of a pair of abutting generally cylindrical fiber optic cable termination pins in light transmission relationship, comprising:

an elongated, generally tubular, relatively thin-walled, member having a mid-region and two end portions, said mid-region having not more than one longitudinally extending narrow slot therein whereby said mid-region has a substantially continuous perimeter, said end portions being each sized to receive a corresponding one of said pins, said pins being inserted therein and abutting within said mid-region;

termination pin alignment means comprising a plurality of resilient, radially, inwardly formed wall portions within said mid-region of said member defining a restricted bore therein, said wall portions being uniformly circumferentially spaced from each other, the transverse cross-section of said pins in said mid-region being greater than the cross-section of said restricted bore whereby said wall portions deflect radially outwardly when said pins are inserted in said restricted bore, the remaining perimeter of said member at said mid-region thereof being arranged and shaped to assume a position of compensatory deflection upon outward deflection of said wall portions, said inwardly formed wall portions thereby exerting resilient, radially inward forces against said pins, at least at the location of said abutting, causing said pins to be precisely laterally aligned; and said circumferentially spaced wall portions defining therebetween arcuately convex perimeter sections of sufficient circumferential length so that upon said perimeter sections assuming said position of compensatory deflection said sections will be come arcuately concave.

* * * * *